United States Patent
Jo et al.

(10) Patent No.: US 10,825,381 B2
(45) Date of Patent: Nov. 3, 2020

(54) DISPLAY SYSTEM AND METHOD FOR CONTROLLING DISPLAY SYSTEM

(71) Applicant: NEC Display Solutions, Ltd., Tokyo (JP)

(72) Inventors: Shigenobu Jo, Tokyo (JP); Hironori Kobayashi, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/512,066

(22) Filed: Jul. 15, 2019

(65) Prior Publication Data

US 2020/0043403 A1    Feb. 6, 2020

(30) Foreign Application Priority Data

Aug. 1, 2018  (JP) .................. 2018-144993

(51) Int. Cl.
*G09G 3/32* (2016.01)

(52) U.S. Cl.
CPC ....... *G09G 3/32* (2013.01); *G09G 2320/0626* (2013.01)

(58) Field of Classification Search
CPC ............ G06F 3/1446; G09G 2300/026; G09G 2320/0626; G09G 3/20; G09G 3/32
USPC .................... 345/98–103, 200–215
See application file for complete search history.

(56) References Cited

U.S. PATENT DOCUMENTS

| | | | |
|---|---|---|---|
| 2006/0044482 A1* | 3/2006 | Shaftel | G02F 1/133 349/33 |
| 2013/0057160 A1* | 3/2013 | Adams | H05B 45/10 315/160 |
| 2013/0199073 A1* | 8/2013 | Jung | F41G 1/30 42/113 |
| 2017/0321849 A1* | 11/2017 | Xiong | H05B 45/00 |
| 2018/0124889 A1* | 5/2018 | Xiong | H05B 45/37 |
| 2018/0160508 A1* | 6/2018 | Gabai | H05B 47/16 |
| 2018/0224074 A1* | 8/2018 | Xiong | F21K 9/278 |
| 2019/0032864 A1* | 1/2019 | Xiong | F21V 3/061 |

FOREIGN PATENT DOCUMENTS

| | | |
|---|---|---|
| JP | H08-321634 A | 12/1996 |
| JP | 2017-009725 A | 1/2017 |

* cited by examiner

*Primary Examiner* — Tony O Davis
(74) *Attorney, Agent, or Firm* — McGinn I.P. Law Group, PLLC.

(57) ABSTRACT

A display system includes: a display device that transits from a power-off state to a power-on state; and a brightness calculation device that calculates a brightness setting sequence based on a humidity amount over a first period in which the display device is in the power-off state, the brightness setting sequence being a sequence of a setting value of a brightness of the display device during a second period, the second period starting from when the display device transits to the power-on state, the setting value changing in time series. The display device displays an image signal at a brightness according to the brightness setting sequence.

19 Claims, 9 Drawing Sheets

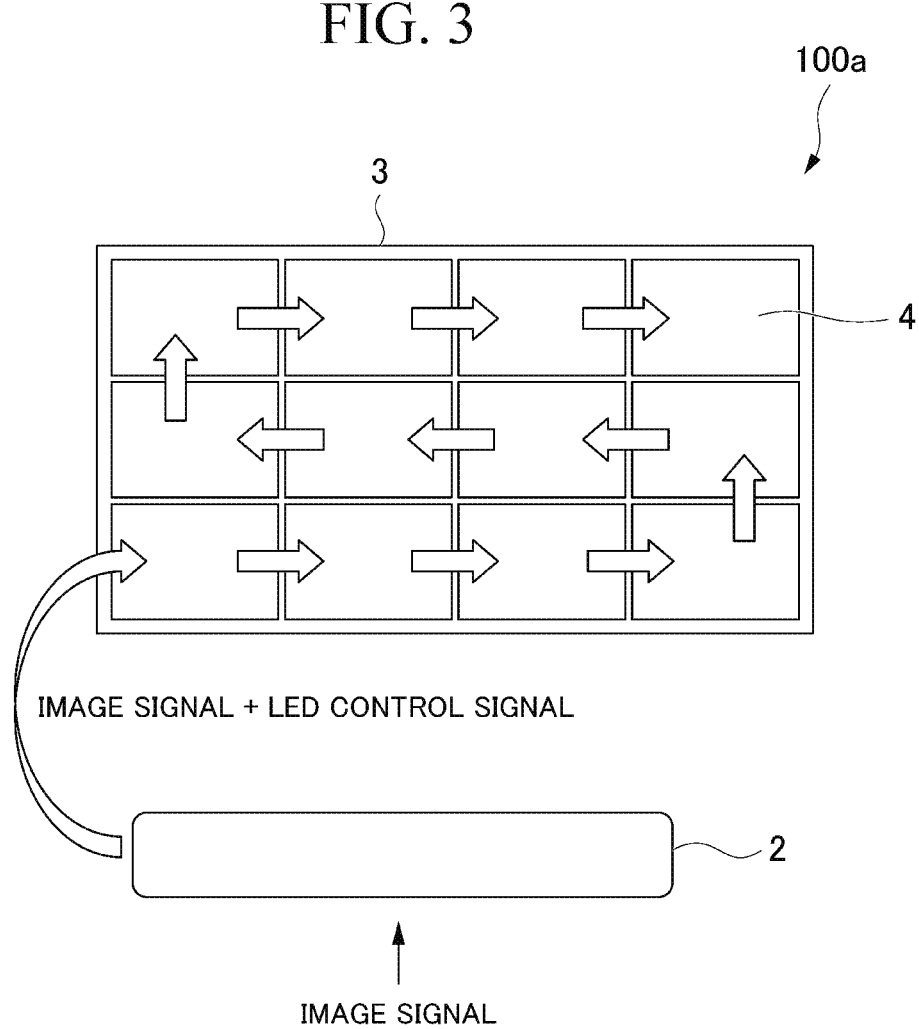

FIG. 5
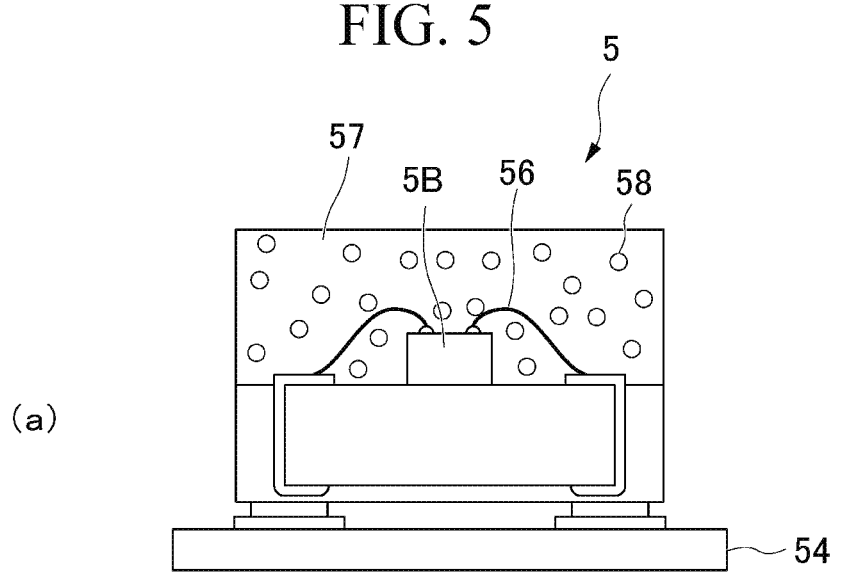
(a)
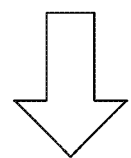
SUDDEN TEMPERATURE RISE OCCURS DUE TO POWER ACTIVATION
(b)
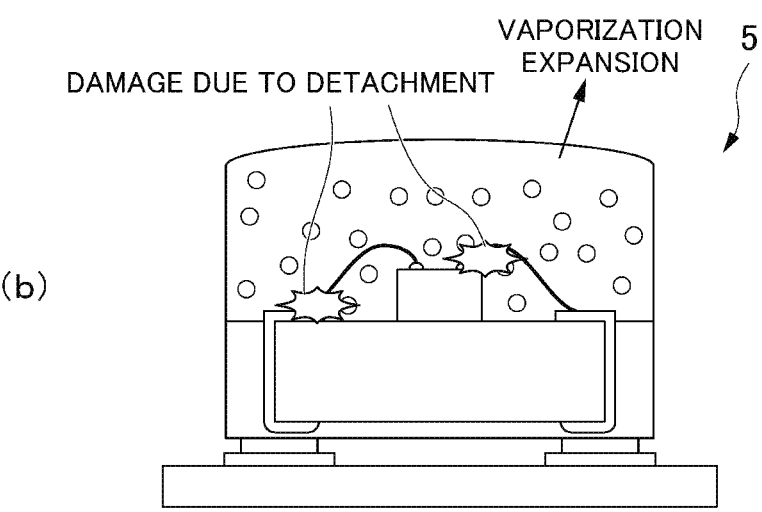

DISPLAY SYSTEM AND METHOD FOR CONTROLLING DISPLAY SYSTEM

CROSS-REFERENCE TO RELATED APPLICATION

Priority is claimed on Japanese Patent Application No. 2018-144993, filed Aug. 1, 2018, the content of which is incorporated herein by reference.

BACKGROUND OF THE INVENTION

Field of the Invention

The present invention relates to a display system and a method for controlling a display system.

Description of Related Art

In LED display devices that include LED elements (light emitting diodes; light emitting elements), the LED elements can sometimes become damaged as described using FIG. 4A to FIG. 5 below.

FIGS. 4A and 4B are diagrams for describing the structure of an LED element. FIG. 4A is a diagram showing an LED element viewed from the side. FIG. 4B is a diagram showing an LED element viewed from the front. Furthermore, FIG. 5 is a diagram for describing an example where an LED element has become damaged due to moisture absorption. Portion (a) of FIG. 5 illustrates a sealing material which has absorbed moisture. Portion (b) of FIG. 5 illustrates detachments which have occurred at joined surfaces.

As shown in FIG. 4B, an LED element 5 is formed by integrating a red LED element 5R, a green LED element 5G, and a blue LED element 5B inside a lamp house 51. Furthermore, as shown in FIG. 4A, the lamp house 51 is connected to a pattern 53 via a pin and solder 52, and the pattern 53 is arranged on an LED substrate 54. Moreover, an AG frame 55 provided inside the lamp house 51 is connected to both terminals of the blue LED element 5B via a bonding wire 56. Here, as shown in FIG. 4A, a sealing material 57 is affixed to the surface of the LED element 5. The sealing material 57 protects the LED element 5 and the interior of the LED element 5, which includes the electrodes (both of the above terminals), from external factors that cause deterioration, such as external impacts and dust. The sealing material 57 is made of a material such as an epoxy or silicone resin.

FIG. 5 illustrates an LED element 5 which has become damaged. As shown in portion (a) of FIG. 5, the epoxy or silicone resin material of the sealing material 57 absorbs humidity (moisture 58). As shown in FIG. 5B, in cases where the LED 5 is not used for a long period of time, the LED element 5 can sometimes become damaged due to detachments at the joined surfaces between the LED element 5B and the bonding wire 56 as a result of expansion (vaporization expansion) of the epoxy material of the sealing material 57, which can arise in cases where heat is suddenly applied upon power activation and a rise in temperature occurs.

Here, conventional techniques include a technique that prevents an LED element from absorbing moisture. For example, Japanese Unexamined Patent Application, First Publication No. 2017-9725 (referred to as Patent Document 1 below) relates to the configuration of a light emitting diode, and describes the configuration of a surface mounted-type light emitting diode capable of being mounted on the surface of a printed circuit board without providing a mounting hole. Furthermore, Japanese Unexamined Patent Application, First Publication No. Hei 8-321634 (referred to as Patent Document 2 below) describes a display device which includes light emitting diodes and is capable of suppressing the intrusion of moisture while also reducing the occurrence of film detachments.

SUMMARY OF THE INVENTION

However, despite the inventions described in Patent Documents 1 and 2 being capable of preventing the absorption of humidity to some extent, in cases where the LED element is not used for a long period of time, the inventions are unable to solve the problem of the LED device becoming damaged due to detachments between the LED element and the bonding wire caused by expansion of the epoxy caused by the sudden application of heat upon power activation.

Here, in order to prevent damage to the LED element, then in cases where the LED element is not used over a long period of time, by carrying out a procedure that gradually applies heat (gradually illuminates the LED element) at the time of the next power activation, vaporization expansion can be prevented, and damage can be suppressed. Consequently, the present invention has an object of monitoring the extent to which humidity has been absorbed by the sealing material in cases where the LED element is not used over a long period of time, while also gradually illuminating the LED element at the next power activation.

That is to say, the present invention has an object of lowering the likelihood of damage to an LED element at power activation of an LED display device after a long period of time has elapsed since the LED display device was placed in a power-off state.

In an exemplary aspect of the present invention, a display system includes: a display device that transits from a power-off state to a power-on state; and a brightness calculation device that calculates a brightness setting sequence based on a humidity amount over a first period in which the display device is in the power-off state, the brightness setting sequence being a sequence of a setting value of a brightness of the display device during a second period, the second period starting from when the display device transits to the power-on state, the setting value changing in time series. The display device displays an image signal at a brightness according to the brightness setting sequence.

In an exemplary aspect of the present invention, a method is a method for controlling a display system that comprises a display device that transits from a power-off state to a power-on state. The method includes: calculating a brightness setting sequence based on a humidity amount over a first period in which the display device is in the power-off state, the brightness setting sequence being a sequence of a setting value of a brightness of the display device during a second period, the second period starting from when the display device transits to the power-on state, the setting value changing in time series; and displaying, by the display device, an image signal at a brightness according to the brightness setting sequence.

According to an exemplary embodiment of the present invention, it is possible to lower the likelihood of damage to an LED element at power activation of an LED display device after a long period of time has elapsed since the LED display device was placed in a power-off state.

BRIEF DESCRIPTION OF THE DRAWINGS

FIG. 3 is a schematic diagram for describing a display system in the present exemplary embodiment.

FIG. 5 is a diagram for describing an example where an LED element has become damaged due to moisture absorption.

DETAILED DESCRIPTION OF THE INVENTION

Figure 1:
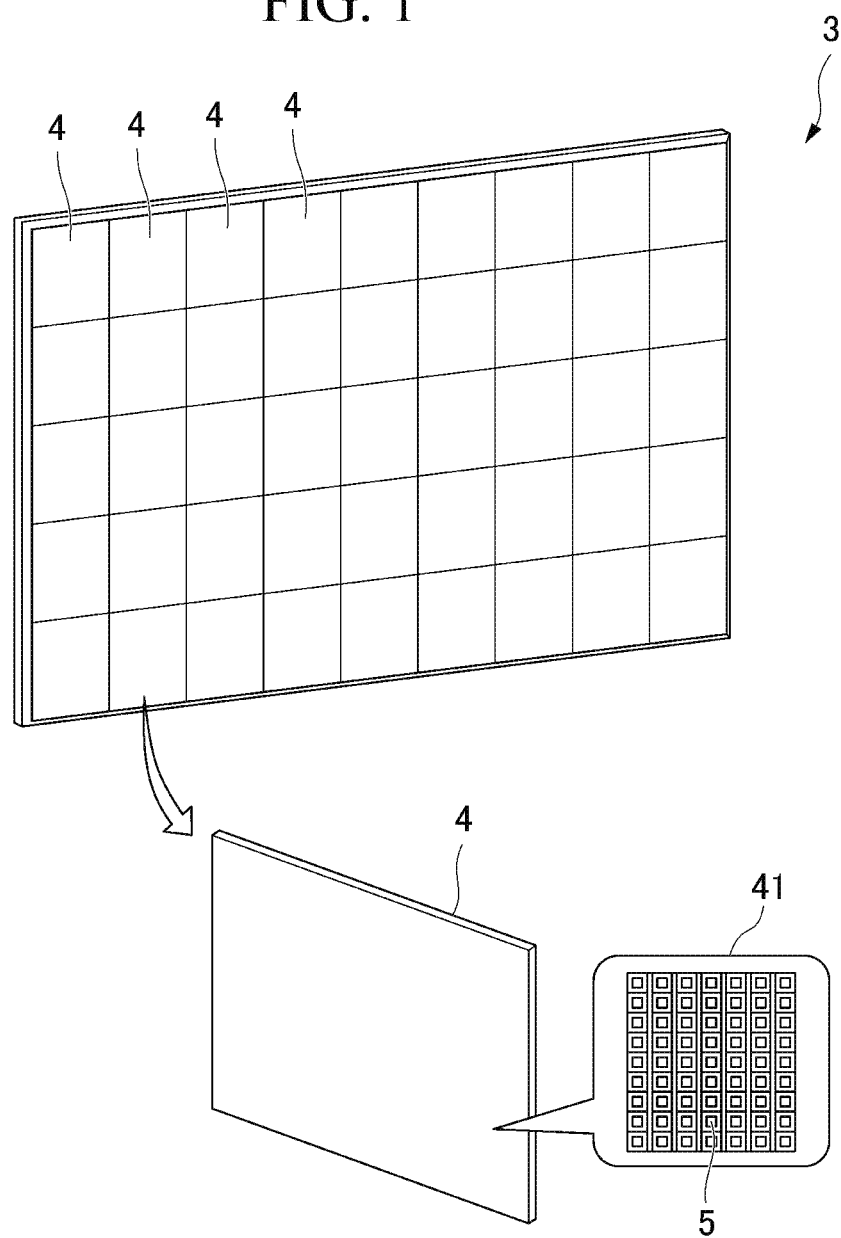
FIG. 1 is a schematic diagram for describing an LED display device in the present exemplary embodiment.

Hereunder, exemplary embodiments of the present invention will be described with reference to the drawings. FIG. 1 is a schematic diagram for describing an LED display device in the present exemplary embodiment. FIG. 1 is a diagram in which an LED display device 3 and LED modules 4 are viewed from the front. As shown in FIG. 1, the LED display device 3 includes a plurality of LED modules 4 and displays an image by arranging the plurality of n LED modules 4 (where n>1 and is a natural number, with n=45 in the diagram) along the vertical and horizontal directions. Furthermore, the LED modules 4 have a display part 41 on which a plurality of LED elements 5 are mounted.

Figure 2A:
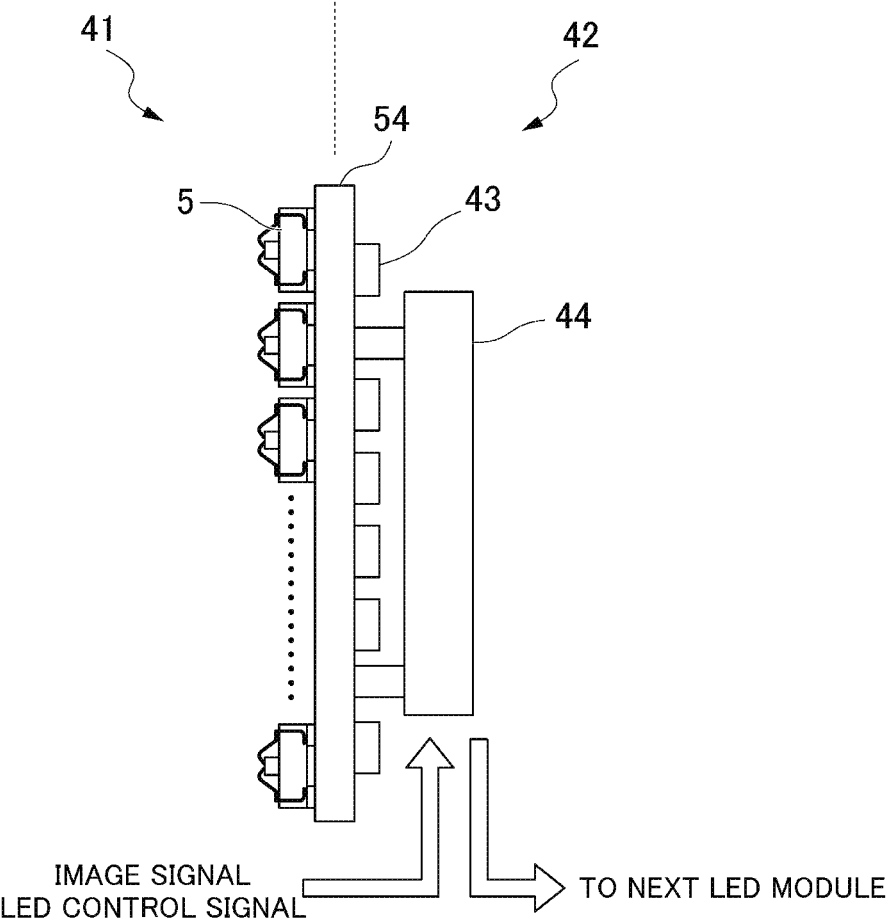
FIG. 2A is a schematic diagram for describing an LED module in the present exemplary embodiment.
Figure 2B:
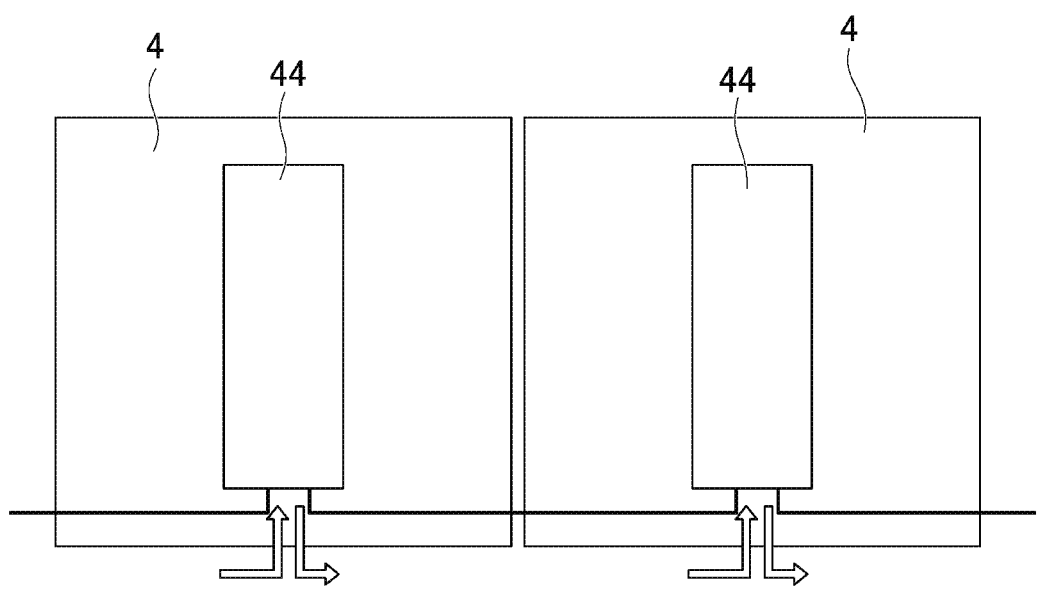
FIG. 2B is a schematic diagram for describing an LED module in the present exemplary embodiment.
Figure 4A:
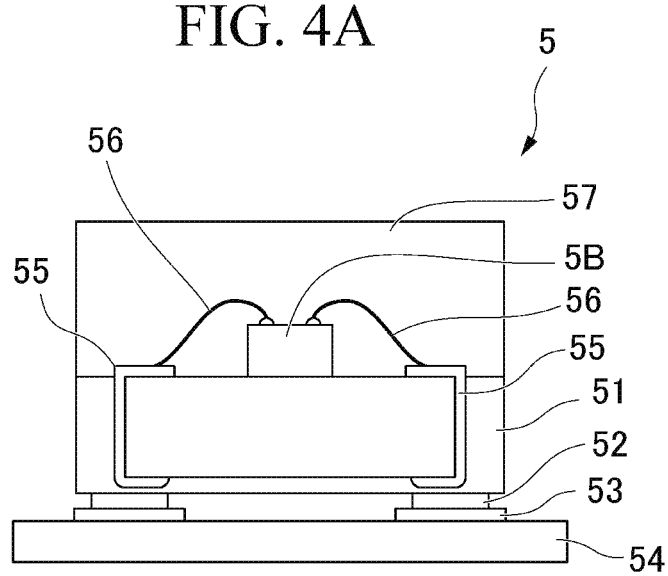
FIG. 4A is a diagram for describing the structure of an LED element.
Figure 4B:
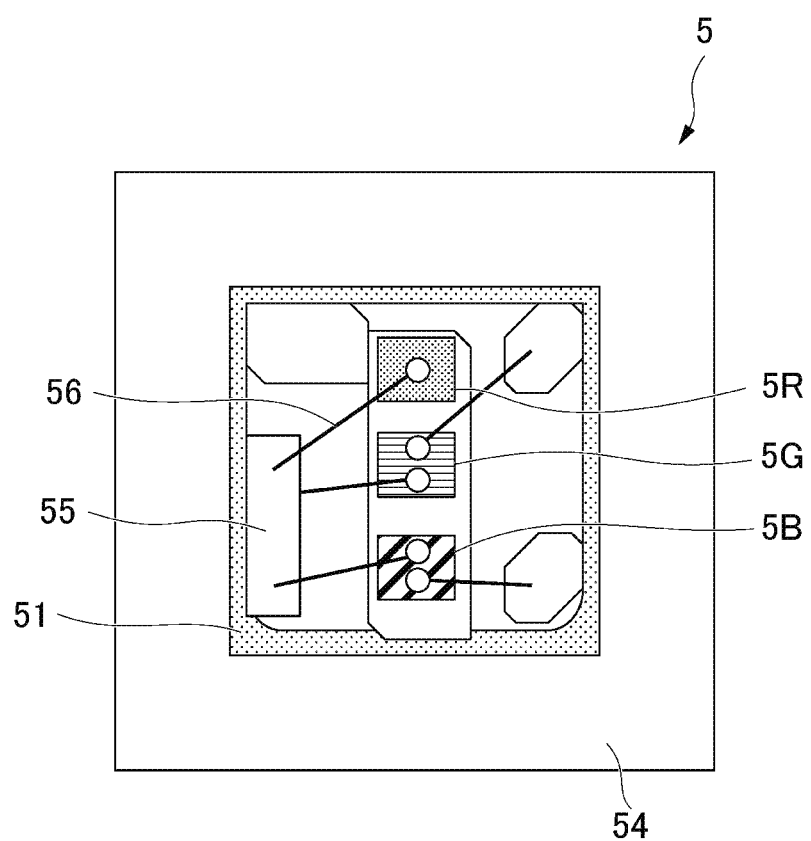
FIG. 4B is a diagram for describing the structure of an LED element.

FIGS. 2A and 2B are schematic diagrams for describing an LED module in the present exemplary embodiment. FIG. 2A is a diagram in which an LED module 4 is viewed from the side. FIG. 2B is a diagram showing the signal wiring when the LED modules 4 are viewed from the rear.

As shown in FIG. 2A, the LED module 4 includes a display part 41 on which a plurality of LED elements 5 are mounted, and a signal processing part 42 having an LED driver IC 43 and an LED control box 44. The display part 41 is arranged on the front of an LED substrate 54, and the signal processing part 42 is arranged on the rear of the LED substrate 54. Here, as shown in FIG. 2A, a single LED element 5 constitutes one pixel, and a plurality of LED elements 5 are mounted on the display part 41 of the LED module 4.

Furthermore, as shown in FIG. 2A and FIG. 2B, a power source, and an image signal for the plurality of LED modules, and an LED control signal are input to the control box 44, and then output to an adjacent LED module 4.

The LED driver IC 43 cuts out the image to be displayed on each LED module 4 based on the signals that are input to the control box 44, and causes each LED module 4 to display the image. Moreover, the brightness setting of the LED modules 4 is performed by means of the LED control signal.

That is to say, the LED modules 4 divide an image signal, and then display the divided image signal at the brightness indicated by the LED control signal (brightness control signal).

FIG. 3 is a schematic diagram for describing a display system in the present exemplary embodiment. FIG. 3 shows an example of a configuration of a display system 100a which includes an LED display device 3 and an LED controller 2.

As shown in FIG. 3, the LED controller 2 converts an input image signal into a signal for the LED modules 4, and then transfers the converted image signal and LED control signal to the LED modules 4.

That is to say, as shown in FIG. 3, the LED controller 2 converts the input image signal into an image signal containing an LED control signal (brightness control signal), and then outputs the converted signal to the first of the LED modules 4 (first LED module) among the plurality of n (n=12) LED modules 4 connected in series (LED display device 3). Furthermore, the LED display device 3 transfers the image signal containing the LED control signal from the first LED module 4 to the twelfth (nth) LED module 4.

The LED control signal is a signal generated by the LED controller 2 based on a brightness setting sequence calculated by a humidity storage device 1 (LED brightness calculation device) described below. However, it is not necessary for the LED control signal to be generated by the LED controller 2. For example, the LED control signal may be generated by the LED driver IC 43 or the control box 44 in the signal processing part 42 of the LED module 4, or by an LED control signal generation unit (not shown in the drawing) provided in the LED display device 3. The LED modules 4 divide the image signal, and then display the divided image signal at the brightness indicated by the LED control signal (brightness control signal).

Next, the features of the exemplary embodiment of the present invention will be described. In the exemplary embodiment, a humidity storage device (LED brightness calculation device) provides an LED element brightness setting sequence at power activation. The humidity storage device has a humidity sensor provided with respect to the LED display device 3 that stores variations in the humidity for the duration the power is OFF (off state), calculates the humidity for the duration the power is OFF, and lowers the likelihood of damage to the LED elements 5 that can occur if the LED elements 5 are activated normally at power activation after being left unused for a long period of time.

In the present exemplary embodiment, the type of LED element used as the LED element 5 is not limited to a surface mounted-type (SMD: Surface Mount Device) LED, and a cannonball-type LED or a micro LED may also be used. Furthermore, LED drive methods include the PWM method and methods that vary the electrical current flowing to the LED. The method of driving the LED is not limited.

Figure 6:
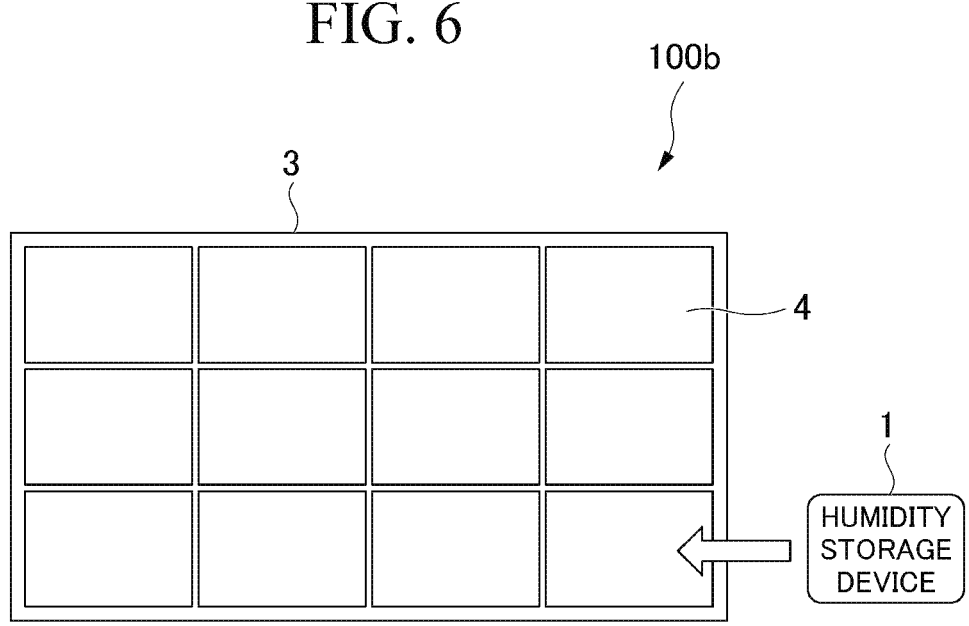
FIG. 6 is a schematic diagram for describing a display system in the present exemplary embodiment.

FIG. 6 is a schematic diagram for describing a display system in the present exemplary embodiment. FIG. 6 shows an example of a configuration of a display system 100b which includes an LED display device 3 and a humidity storage device 1 (LED brightness calculation device). Furthermore, FIG. 7 is a block diagram showing the configuration of the humidity storage device 1.

As shown in FIG. 6, a humidity storage device 1 that detects a humidity amount by means of a humidity sensor and a count-up timer, and calculates an optimal brightness setting sequence, is provided in the vicinity of the LED display device 3. The installation position of the LED display device 3 is not particularly specified.

Figure 7:
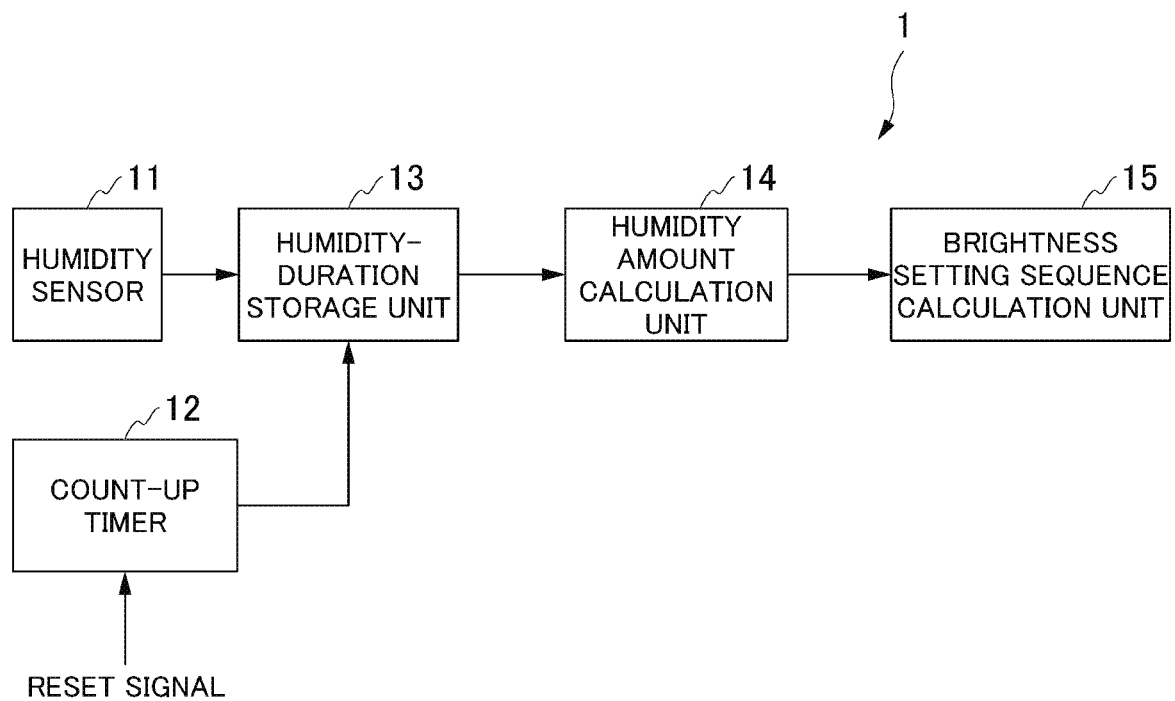
FIG. 7 is a block diagram showing the configuration of a humidity storage device 1.

As shown in FIG. 7, the humidity storage device 1 includes a humidity sensor 11, a count-up timer 12, a humidity-duration storage unit 13, a humidity amount calculation unit 14, and a brightness setting sequence calculation unit 15.

The humidity sensor 11 measures the humidity in the surroundings of the LED display device, and outputs the measured humidity to the humidity-duration storage unit 13.

The count-up timer 12 is a timer that measures the measurement duration of the humidity sensor 11 commencing immediately after the LED display device 3 is placed in a power-off state. When a reset signal serving as the signal indicating the start of a measurement is input from the LED controller 2, the LED display device 3, or the like, then the count-up timer 12 resets the measurement duration (power OFF duration) to 0 and starts measuring the measurement duration of the humidity sensor 11.

Figure 9:
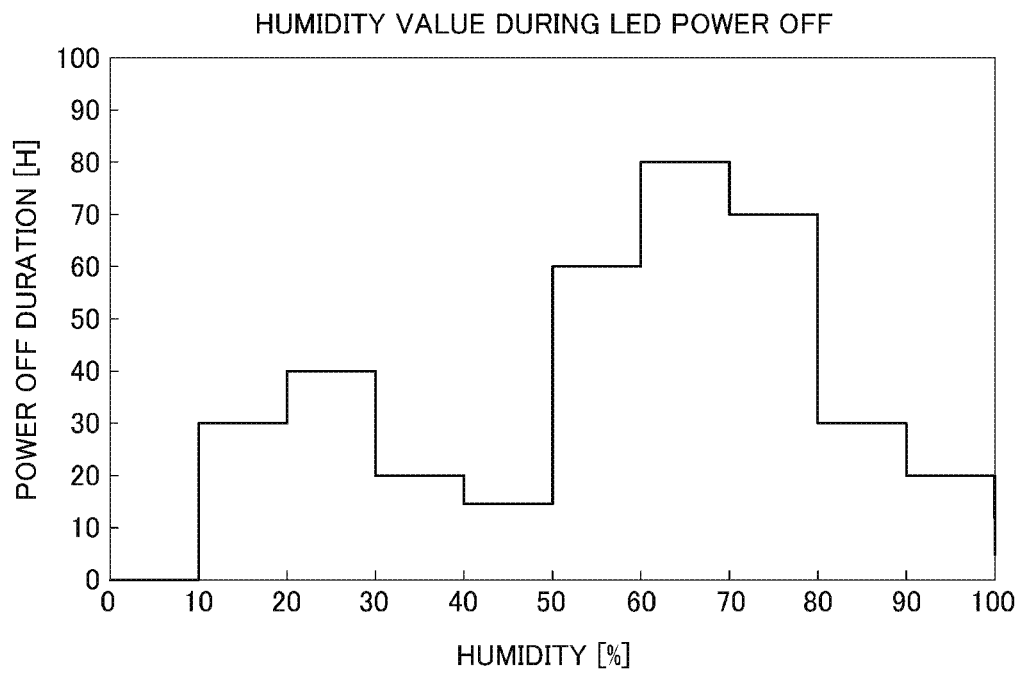
FIG. 9 is a diagram showing the relationship between humidity values and durations.

Here, FIG. 9 is a diagram showing the relationship between humidity values and durations.

The humidity-duration storage unit 13 reads the humidity values which are output by the humidity sensor 11 for the duration the count-up timer 12 measures the measurement duration of the humidity sensor 11 (the duration the LED display device 3 is in a power-off state), and saves (stores) the humidity values and the durations measured by the count-up timer 12 in the format shown in FIG. 9. The format shown in FIG. 9 enables comprehension of the relationship between the humidity values [%] and the power OFF duration [H] during which the humidity sensor 11 indicates those humidity values [%].

The count-up timer 12 and the humidity-duration storage unit 13 perform the processing described above during the period up to the next transition of the display device 3 to a power-on state. Of course, it is sufficient for the humidity sensor 11 to measure the humidity during the same period as the count-up timer 12 and the humidity-duration storage unit 13, and measurements in periods where the display device 3 is in a power-on state are not required.

The humidity amount calculation unit 14 calculates the humidity amount for the period in which the LED display device 3 is in a power-off state. For example, in terms of the calculation of the humidity amount, assuming a humidity of 10% over an X hour power OFF duration, a humidity of 50% over a Y hour power OFF duration, and a humidity of 90% over a Z hour power OFF duration, the humidity amount is given by $0.1 \times X + 0.5 \times Y + 0.9 \times Z$.

That is to say, the humidity amount can be defined by a sum of products of the measured humidities and the durations over which those humidities were measured.

Figure 10:
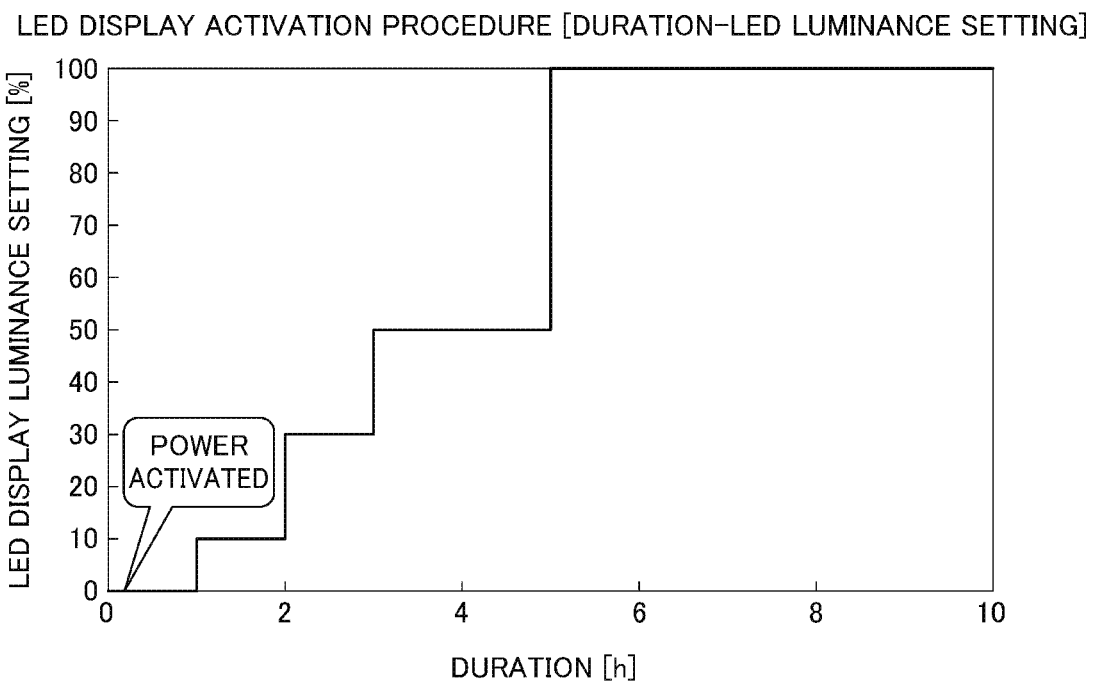
FIG. 10 is a diagram showing an example of a brightness setting activation sequence calculated by a brightness setting sequence calculation unit 15.

The brightness setting sequence calculation unit 15 calculates a brightness setting sequence performed after activation of the LED element 5 that corresponds to the humidity amount. FIG. 10 is a diagram showing an example of a brightness setting activation sequence calculated by the brightness setting sequence calculation unit 15.

In FIG. 10, the horizontal axis represents the duration [h] after power activation, and the vertical axis represents the luminance (brightness) setting value [%] of the display part 41 of the LED display (LED module 4).

As shown in FIG. 10, the brightness setting activation sequence gradually increases the brightness from 0% toward 100% (prescribed expected value; brightness value during normal operation) after transition of the LED display device 3 to a power-on state.

That is to say, during conventional normal operation, after activation of the power to the LED display device 3, the brightness setting was performed such that the brightness reached 100% (prescribed expected value) over a period of, for example, several minutes to several tens of minutes, which caused heat to be suddenly applied to the LED element 5. However, if the brightness setting is performed in this manner, the epoxy or silicone resin material of the sealing material 57 constituting the LED element undergoes vaporization expansion and results in detachments between the LED element 5 and the bonding wire 56, leading to the problem of the LED element 5 becoming damaged.

Therefore, the brightness setting activation sequence of the present exemplary embodiment has a configuration in which the brightness is gradually increased from 0% toward 100% after transition of the LED display device 3 to a power-on state. As a result, the humidity storage device 1 provides an optimal activation sequence corresponding to the calculated humidity amount.

The brightness setting sequence may have a configuration wherein, if the calculated humidity amount is greater than a prescribed threshold, the brightness is gradually increased toward a prescribed expected value over a longer duration than a prescribed duration after the LED display device 3 (display device) is placed in a power-on state, and if the calculated humidity amount is the prescribed threshold or less, the brightness is gradually increased toward the prescribed expected value over a duration which is the prescribed duration or less after the LED display device 3 is placed in a power-on state.

Here, the prescribed threshold and the prescribed duration may represent values determined by allowing the humidity storage device 1 to alter the calculated humidity amount and the calculated brightness setting sequence multiple times at the time of design, and then performing experiments with respect to a plurality of LED display devices 3 using the altered humidity amount and brightness setting sequence.

Figure 8A:
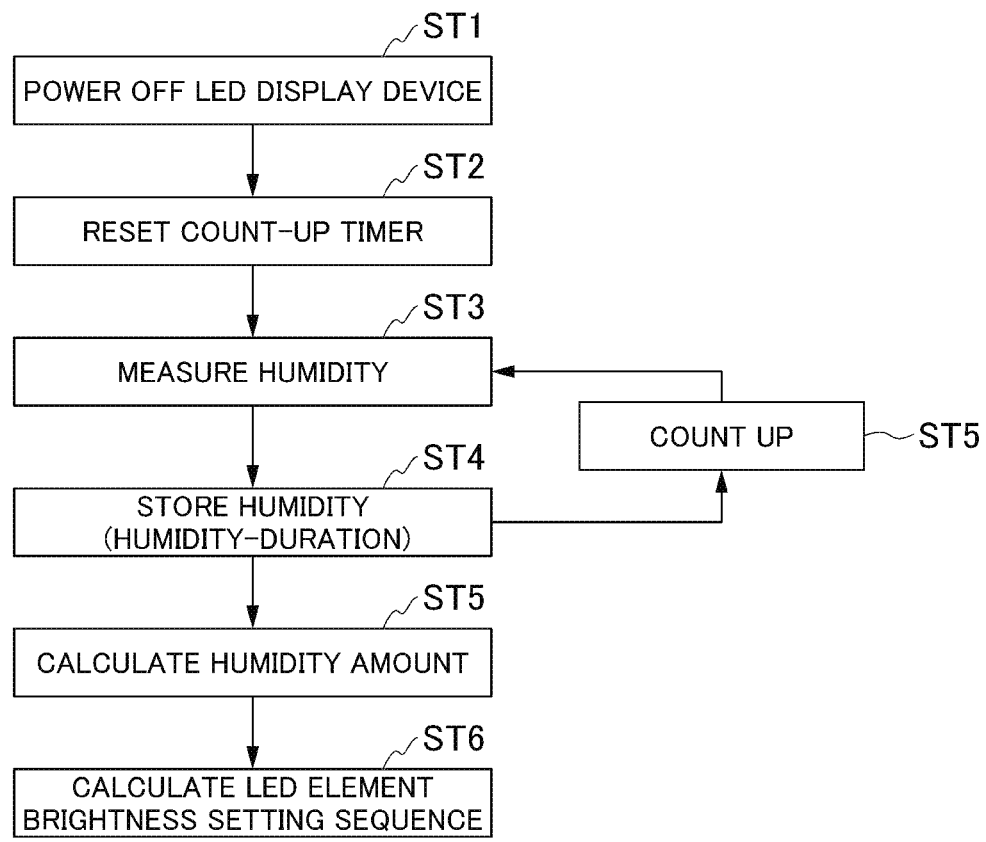
FIG. 8A is a diagram showing a flowchart of a power OFF/ON of a display system in the present exemplary embodiment.
Figure 8B:
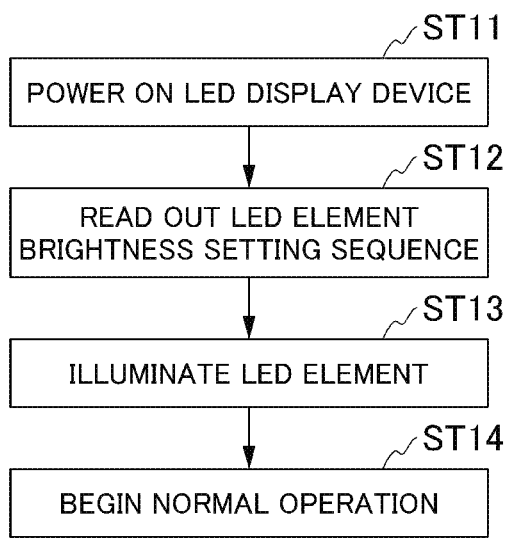
FIG. 8B is a diagram showing a flowchart of a power OFF/ON of a display system in the present exemplary embodiment.

Next, an operation performed at power OFF/ON of the display system of the present exemplary embodiment will be described. FIGS. 8A and 8B are diagrams showing flowcharts at power OFF/ON of the display system according to the present exemplary embodiment. FIG. 8A represents the processing performed when the LED display device 3 is placed in a power-off state. FIG. 8B represents the processing performed when the LED display device 3 is placed in a power-on state.

First, the processing performed when the LED display device 3 is placed in a power-off state will be described with reference to FIG. 8A.

The power of the LED display device is turned OFF (step ST1).

That is to say, the LED display device 3 undergoes transition to a power-off state.

Then, the count-up timer is reset (step ST2).

Specifically, when a reset signal serving as the signal indicating the start of a measurement is input from the LED controller 2 or the LED display device 3, the count-up timer 12 resets the measurement duration (power OFF duration) to 0 [H], and starts measuring the measurement duration of the humidity sensor 11.

The humidity sensor measures the humidity (step ST3).

Specifically, the humidity sensor 11 measures the humidity in the surroundings of the LED display device, and outputs the measured humidity to the humidity-duration storage unit 13.

The humidity-duration storage unit stores the humidity-duration (step ST4).

Specifically, the humidity-duration storage unit 13 reads the humidity values which are output by the humidity sensor 11 for the duration the count-up timer 12 measures the measurement duration of the humidity sensor 11, and saves the humidity values and the durations measured by the count-up timer 12 in the format shown in FIG. 9.

The format shown in FIG. 9 enables comprehension of the relationship between the humidity value [%] and the power OFF duration [H] during which the humidity sensor 11 indicates those humidity values [%].

Because the count-up timer 12 and the humidity-duration storage unit 13 perform the processing described above during the period up to the next transition of the LED display device 3 to a power-on state, the flow proceeds to step ST5 in cases where the LED display device 3 is in a power-off state.

The count-up timer counts up (step ST5).

The count-up timer 12 increases the power-off duration being measured.

Because the count-up timer 12 and the humidity-duration storage unit 13 perform the processing of ST3 through ST5 described above during the period up to the next transition of the LED display device 3 to a power-on state, the flow proceeds to step ST6 when the LED display device 3 undergoes transition to a power-on state.

The humidity amount calculation unit calculates the humidity amount (step ST6).

Specifically, the humidity amount calculation unit 14 calculates the humidity amount for the period in which the LED display device 3 is in a power-off state.

The brightness setting sequence calculation unit calculates the brightness setting sequence of the LED element 5 (step ST7).

Specifically, the brightness setting sequence calculation unit 15 calculates a brightness setting sequence performed after activation of the LED element 5, that corresponds to the humidity amount.

Next, the processing performed when the LED display device 3 is placed in a power-on state is described with reference to FIG. 8B.

The power of the LED display device is turned ON (step ST11).

That is to say, the LED display device 3 undergoes transition to a power-on state.

The brightness setting sequence of the LED element 5 is read out (step ST12).

Specifically, the LED controller 2 receives from the brightness setting sequence calculation unit 15 the brightness setting sequence calculated by the brightness setting sequence calculation unit 15.

The LED element is illuminated (step ST13).

Specifically, the LED controller 2 converts the input image signal into an image signal containing an LED control signal (brightness control signal), which is based on the brightness setting sequence, and then outputs the converted signal to the first LED module 4 among the plurality of n LED modules 4 connected in series (LED display device 3). Furthermore, the LED display device 3 transfers the image signal containing the LED control signal from the first LED module 4 to the nth LED module 4. Moreover, the LED modules 4 divide the image signal, and then display the divided image signals at the brightness indicated by the LED control signal (brightness control signal), which is based on the brightness setting sequence. That is to say, the LED modules 4 are activated by the brightness setting sequence.

The flow transitions to a normal operation (step ST14).

That is to say, if the brightness in the brightness setting sequence reaches a 100% brightness value, the brightness setting sequence is terminated and the LED display device 3 undergoes transition to a normal operation. At this time, the humidity storage device assumes that transition of the LED display device 3 to a power-on state has taken place, resets the humidity amount, and stands by for the next time the LED display device 3 is placed in a power-off state.

Figure 11:
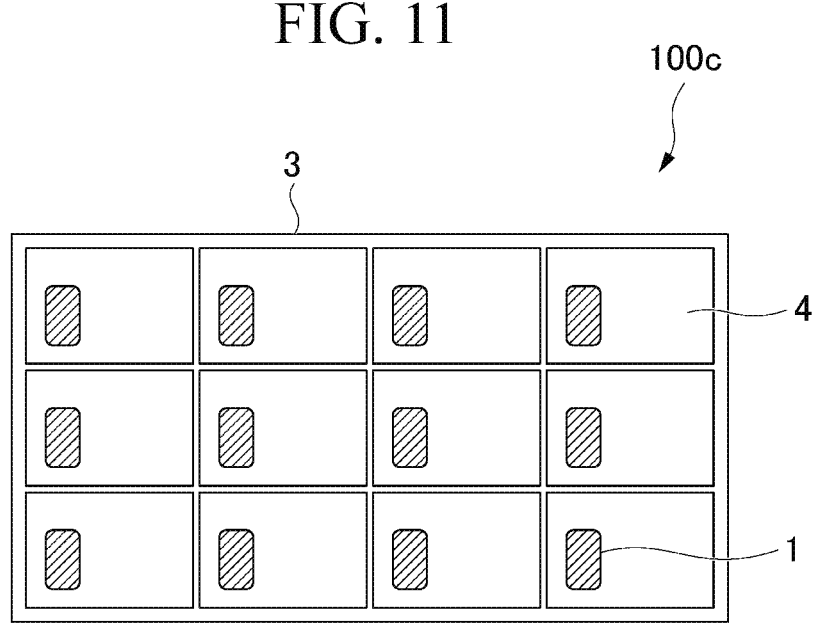
FIG. 11 is a schematic diagram for describing another display system according to the present exemplary embodiment.

FIG. 11 is a schematic diagram for describing another display system according to the present exemplary embodiment. FIG. 11 shows an example of a configuration of a display system 100c which includes an LED display device 3 and a plurality of humidity storage devices 1 (LED brightness calculation devices).

As illustrated by the configuration diagram shown in FIG. 11, the display system of the present exemplary embodiment is an LED display device 3 in which each LED module 4 has a humidity storage device 1 mounted on the rear surface of the LED module 4.

In the display system of the present exemplary embodiment, an optimal activation sequence is determined by the humidity amount calculated by each LED module 4. In this case, the maximum humidity amount among those calculated by the LED modules 4 is extracted to calculate the activation sequence, and then the sequence is applied to all of the LED modules 4.

As described above, by carrying out the exemplary embodiment of the present invention, a display system can be provided that has an LED element brightness setting sequence performed at power activation that lowers the likelihood of damage to the LED elements 5 that can occur if the LED elements 5 are activated normally at power activation after being left unused for a long period of time.

Figure 12:
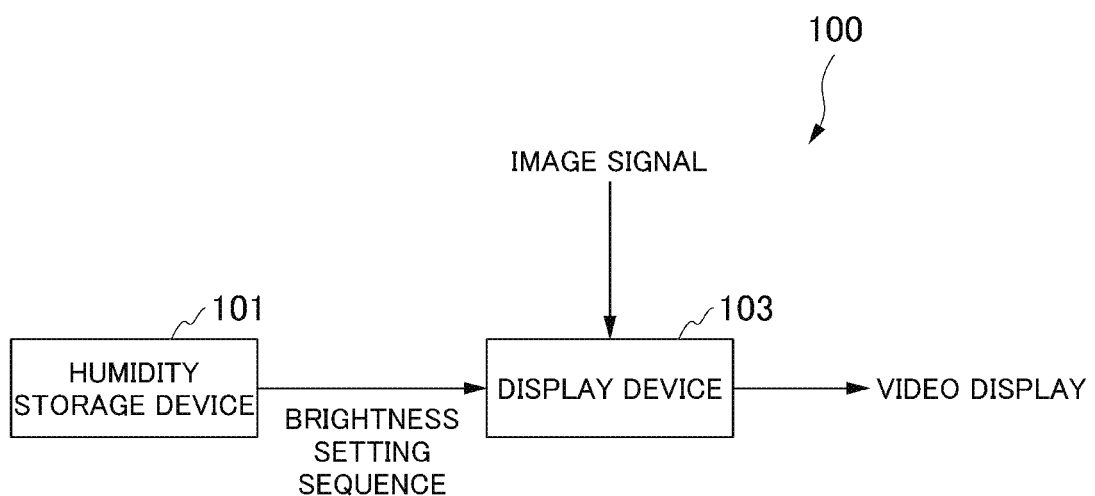
FIG. 12 is a block diagram showing an example of the basic configuration of a display system according to an exemplary embodiment of the present invention.

Next, an example of the basic configuration of an exemplary embodiment of the present invention will be described with reference to FIG. 12. FIG. 12 is a block diagram showing an example of the basic configuration of a display system according to an exemplary embodiment of the present invention. The display system 100 shown in FIG. 12 includes a display device 103 and a humidity storage device 101 (brightness calculation device).

The display device 103 displays an image signal at the brightness indicated by a brightness control signal, which is based on a brightness setting sequence.

The humidity storage device 101 calculates the brightness setting sequence such that the brightness indicated by the brightness control signal after transition of the display device 103 to a power-on state is varied in a time series, according to a humidity amount calculated over a period in which the display device 103 was placed in a power-off state.

The relationship between the configuration shown in FIG. 12 or limited configurations thereof, and the configurations shown in FIG. 3, FIG. 6, and FIG. 7 are as follows. The display system 100 shown in FIG. 12 corresponds to the display system 100a shown in FIG. 3 and the display system 100b shown in FIG. 6. Furthermore, the display device 103 shown in FIG. 12 corresponds to the display device 3 shown in FIG. 3 and FIG. 6. Moreover, the humidity storage device 101 shown in FIG. 12 corresponds to the humidity storage device 1 shown in FIG. 6 and FIG. 7.

An exemplary embodiment of the present invention has been described above with reference to the drawings. However, specific configurations are in no way limited to the exemplary embodiment described above, and designs and the like within a scope not departing from the gist of the present invention are also included.

For example, a program for realizing the functions of the humidity storage device 101 shown in FIG. 12 may be stored on a computer-readable recording medium, and the calculation step performed by the humidity amount calculation unit 14 and the calculation step performed by the brightness setting sequence calculation unit 15 may be performed in a control system of the humidity storage device 101 by a computer system reading and executing the program recorded on the recording medium. The "computer system" referred to here is assumed to include an OS and hardware such as a peripheral device. Furthermore, if the "computer system" utilizes a WWW system, it is assumed to also include a website providing environment (or display environment). Moreover, the "computer-readable recording medium" refers to a portable medium such as a flexible disk, a magneto-optical disk, a ROM, or a CD-ROM, or a storage device such as a hard disk built into the computer system. In addition, the "computer-readable recording medium" is assumed to include those that dynamically retain the program for a fixed period of time, such as the volatile memory (RAM) inside a computer system serving as a server or a client in a case where the program is transmitted via a network such as the Internet, or a communication line such as a telephone line. The program described above may be one that realizes a portion of the functions mentioned above. Further, the program may be one capable of realizing the functions described above in combination with a program already recorded in the computer system.

What is claimed is:

1. A display system, comprising:
a display device that transits from a power-off state to a power-on state; and
a brightness calculation device that calculates a brightness setting sequence based on a humidity amount over a first period in which the display device is in the power-off state, the brightness setting sequence being a sequence of a setting value of a brightness of the display device during a second period, the second period starting from when the display device transits to the power-on state, the setting value changing in time series,
wherein the display device displays an image signal at a brightness according to the brightness setting sequence,
wherein the brightness calculation device calculates, as the brightness setting sequence, a sequence in which the setting value gradually increases toward a prescribed expected value over a duration which is longer than a prescribed duration, in a case where the calculated humidity amount is greater than a prescribed threshold, and
wherein the brightness calculation device calculates, as the brightness setting sequence, a sequence in which the setting value gradually increases toward the prescribed expected value over a duration which is the prescribed duration or less in a case where the calculated humidity amount is the prescribed threshold or less.

2. The display system according to claim 1, wherein the brightness calculation device measures humidity in surroundings of the display device, and calculates the humidity amount by calculating a sum of a product of the measured humidity and A duration over which the humidity was measured.

3. The display system according to claim 1, wherein the setting value gradually increases toward the prescribed expected value from start of the second period.

4. The display system according to claim 1, wherein the brightness calculation devices comprises a plurality of the brightness calculation devices that are mounted on a rear surface of the display device, and
wherein the brightness setting sequence is calculated based on a maximum humidity amount among humidity amounts calculated by the plurality of brightness calculation devices.

5. The display system according to claim 1, wherein the brightness calculation devices comprises a plurality of the brightness calculation devices, and
wherein the brightness setting sequence is calculated based on a maximum humidity amount among humidity amounts calculated by the plurality of brightness calculation devices.

6. The display system according to claim 1, wherein the setting value gradually increases toward the prescribed expected value after the display device transits to the power-on state.

7. A method for controlling a display system that comprises a display device that transits from a power-off state to a power-on state, the method comprising:
calculating a brightness setting sequence based on a humidity amount over a first period in which the display device is in the power-off state, the brightness setting sequence being a sequence of a setting value of a brightness of the display device during a second period, the second period starting from when the display device transits to the power-on state, the setting value changing in time series; and
displaying, by the display device, an image signal at a brightness according to the brightness setting sequence,
wherein the calculating of the brightness setting sequence comprises:
calculating, as the brightness setting sequence, a sequencing which the setting value gradually increases toward a prescribed expected value over a duration which is longer than a prescribed duration in a case where the calculated humidity amount is greater than a prescribed threshold; and
calculating, as the brightness setting sequence, a sequence in which the setting value gradually increases toward the prescribed expected value over a duration which is the prescribed duration or less, in a case where the calculated humidity amount is the prescribed threshold or less.

8. The method for controlling the display system according to claim 7, wherein the humidity amount is calculated based on a sum of a product of the measured humidity and a duration over which the humidity is measured.

9. The method for controlling the display system according to claim 7, wherein the brightness setting sequence is calculated based on a maximum humidity amount among humidity amounts calculated by a plurality of brightness calculation devices.

10. The method for controlling the display system according to claim 9, wherein the plurality of brightness calculation devices are mounted on a rear surface of the display device.

11. The method for controlling the display system according to claim 7, wherein the setting value gradually increases toward the prescribed expected value after the display device transits to the power-on state.

12. A display system, comprising:
a light emitting diode (LED) display device comprising a plurality of LED elements constituting pixels;
a humidity sensor that measures humidity over a period in which the LED display device is in a power-off state;
a brightness calculation device that calculates, based on an amount of the measured humidity over the period, a brightness setting sequence in which a brightness of the LED elements is changed in time series, the brightness setting sequence starting after the LED display device transits from the power-off state to a power-on state,
wherein the brightness calculation device calculates, as the brightness setting sequence, a sequence in which the brightness gradually increases toward a prescribed expected value over a duration which is longer than a prescribed duration after the LED display device transits to the power-on state, in a case where the amount of the measured humidity over the period is greater than a prescribed threshold.

13. The display system according to claim 12, wherein the brightness calculation device calculates, as the brightness setting sequence, a sequence in which the brightness gradually increases toward the prescribed expected value over a duration which is the prescribed duration or less after the LED display device transits to the power-on state, in a case where the amount of the measured humidity over the period is the prescribed threshold or less.

14. The display system according to claim 12, wherein the brightness calculation devices comprises a plurality of the brightness calculation devices, and
wherein the brightness setting sequence is calculated based on a maximum humidity amount among humidity amounts calculated by the plurality of brightness calculation devices.

15. The display system according to claim 14, wherein the plurality of brightness calculation devices are mounted on a rear surface of the LED display device.

16. The display system according to claim 12, wherein the brightness gradually increases toward the prescribed expected value after the display device transits to the power-on state.

17. The display system according to claim 12, wherein a single element of the plurality of LED elements constitutes a pixel of the pixels.

18. The display system according to claim 12, wherein the brightness calculation device calculates the brightness setting sequence such that the brightness indicated by a brightness control signal after transition of the display device to the power-on state is varied in the time series, according to the amount of the measured humidity calculated over the period in which the display device is placed in the power-off state.

19. The display system according to claim 12, wherein the brightness calculation device calculates the humidity amount by calculating a sum of a product of the amount of the measured humidity and a duration over which the humidity is measured.

* * * * *